(12) United States Patent
Thomas et al.

(10) Patent No.: US 9,224,177 B2
(45) Date of Patent: Dec. 29, 2015

(54) SYSTEMS AND METHODS FOR SEARCHING FOR AND TRANSLATING REAL ESTATE DESCRIPTIONS FROM DIVERSE SOURCES UTILIZING AN OPERATOR-BASED PRODUCT DEFINITION

(75) Inventors: Gilbert Allan Thomas, Clearfield, UT (US); Scott Hintze, Ogden, UT (US); Daniel Stamey, Roy, UT (US)

(73) Assignee: Market Data Service LLC, Layton, UT (US)

( * ) Notice: Subject to any disclaimer, the term of this patent is extended or adjusted under 35 U.S.C. 154(b) by 30 days.

(21) Appl. No.: 13/290,020

(22) Filed: Nov. 4, 2011

(65) Prior Publication Data

US 2012/0209829 A1 Aug. 16, 2012

Related U.S. Application Data

(60) Provisional application No. 61/410,848, filed on Nov. 5, 2010, provisional application No. 61/439,835, filed on Feb. 5, 2011, provisional application No. 61/463,356, filed on Feb. 16, 2011.

(51) Int. Cl.
*G06F 17/30* (2006.01)
*G06Q 50/16* (2012.01)

(52) U.S. Cl.
CPC .......... *G06Q 50/16* (2013.01); *G06F 17/30557* (2013.01)

(58) Field of Classification Search
CPC ................................................ G06F 17/30557
USPC ........................................................ 707/722
See application file for complete search history.

(56) References Cited

U.S. PATENT DOCUMENTS

| | | | |
|---|---|---|---|
| 2004/0117377 A1* | 6/2004 | Moser et al. ..................... | 707/10 |
| 2004/0153432 A1* | 8/2004 | O'Halloran et al. .............. | 707/1 |
| 2005/0114306 A1* | 5/2005 | Shu et al. .......................... | 707/3 |
| 2007/0050342 A1* | 3/2007 | Inkinen et al. ..................... | 707/3 |
| 2008/0313225 A1* | 12/2008 | Spicer et al. ............... | 707/104.1 |
| 2010/0145902 A1* | 6/2010 | Boyan et al. ..................... | 706/54 |
| 2011/0202513 A1* | 8/2011 | Singh ............................. | 707/706 |

* cited by examiner

*Primary Examiner* — Grace Park
(74) *Attorney, Agent, or Firm* — Terrence J. Edwards; TechLaw Ventures, PLLC

(57) ABSTRACT

Disclosed herein are: systems capable of searching, receiving and conglomerating the data from real estate databases of varying formats, and translating that received into a common format; execution of pre-defined translation rules referencing data tags used within the system or the originating databases; rules constructed in a simple, hierarchical or a class-based structure whereby one rule depends upon the output of another rule for its input; data sources prioritized or merged where the same property-related information is presented in more than one source; map definitions containing rule sets crafted for a particular use, such as for a particular consumer or user; such systems used in the course of real estate appraisals, in property search reports, extending across databases of differing formats. Detailed information on various example embodiments of the inventions are provided in the Detailed Description below, and the inventions are defined by the appended claims.

18 Claims, 14 Drawing Sheets

```
- PrefixOperator_1
  - Inputs
    - Value_1
      - Parameter Direction = Input
      - Linked Parameter = Nothing
      - Parameter Data Type = String
      - Parent = PrefixOperator_1
      - Value = "abc"
  - Outputs
    - Out_1
      - Parameter Direction = Output
      - Linked Parameter = CapitalizeOperator1.Inputs.Value_1
      - Parameter Data Type = String
      - Parent = PrefixOperator_1
      - Value = "efgabc"
  - Run Operation()
    - Prefix the text from Value_1.Value with "efg"
- CapitalizeOperator1
  - Inputs
    - Value_1
      - Parameter Direction = Input
      - Linked Parameter = PrefixOperator_1.Outputs.Out_1
      - Parameter Data Type = String
      - Parent = PrefixOperator_1
      - Value = "efgabc"
  - Outputs
    - Out_1
      - Parameter Direction = Output
      - Linked Parameter = Nothing
      - Parameter Data Type = String
      - Parent = PrefixOperator_1
      - Value = "EFGABC"
  - RunOperation()
    - Capitalize the text from Value_1.Value.
```

```xml
<executionplan id="DesignStyle">
<operation id="MultiProviderMerger_1" type="DataMasterPlus.Operators.MultiProviderMerger">
    <OperatorDefinition ShowException="0" ShowAllOnLine="0" Separator="/">
      <PrioritizedElements>
<PrioritizedElement DataProviderName="Sandicor - San Diego" Priority="1"
        ExecPanXPath="MapDefinition/DataProviders/Provider[@name='Sandicor - San Diego']
    /ReportMapping/FieldMap[@ReportName='URAR-05'
    and @CommonName='DesignStyle']/Custom/executionplan[@id='DesignStyle']" />
<PrioritizedElement DataProviderName="Realist" Priority="1"
        ExecPanXPath="MapDefinition/DataProviders/Provider[@name='Realist']/ReportMapping
    /FieldMap[@ReportName='URAR-05'
    and @CommonName='DesignStyle']/Custom/executionplan[@id='DesignStyle']" />
      </PrioritizedElements>
    </OperatorDefinition>
  </operation>
  <Inputs>
    <Input id="Sandicor - San DiegoArchitectural Style"
    Name="Sandicor - San DiegoArchitectural Style" parentid="MultiProviderMerger_1" />
    <Input id="RealistStyle" Name="RealistStyle" parentid="MultiProviderMerger_1" />
  </Inputs>
  <Outputs>
    <Output id="Out1" Name="Out1" parentid="MultiProviderMerger_1" />
  </Outputs>
</executionplan>
```

FIG. 17

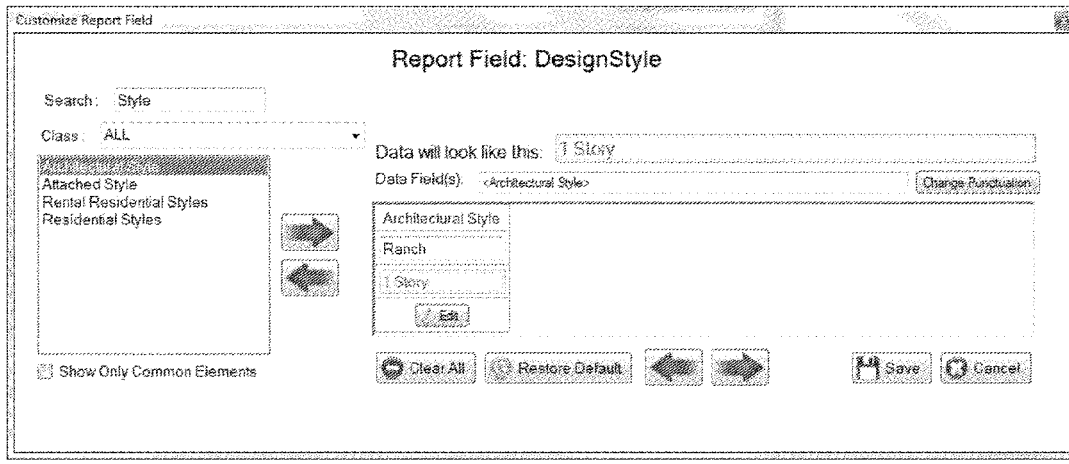

FIG. 18

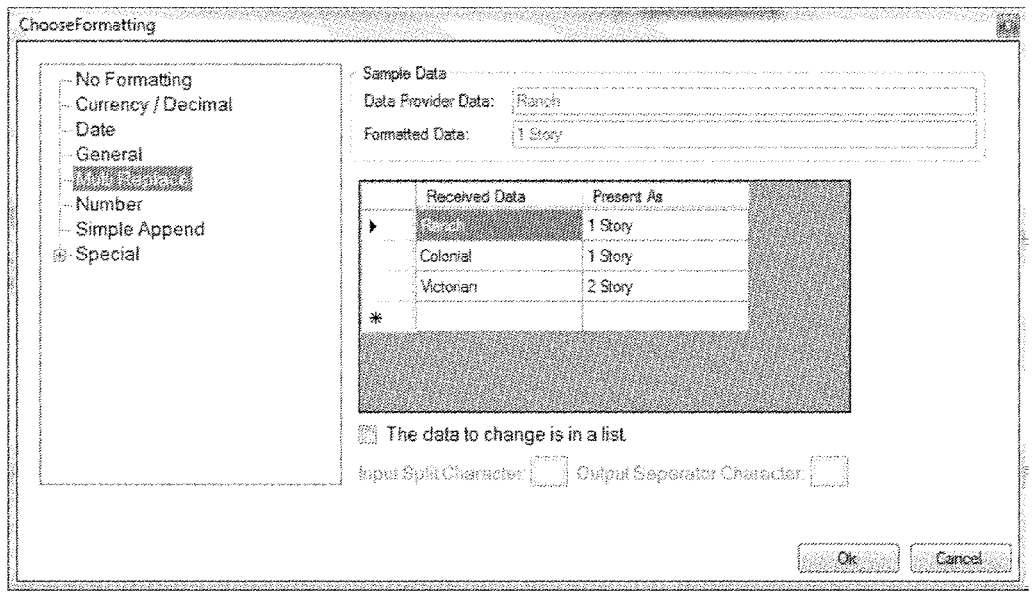

FIG. 19

```
<executionplan id="DesignStyle">
    <operation id="Architectural Style" type="DataMasterPlus.Operators.DataProviderOperator">
      <OperatorDefinition DataFieldKey="Architectural Style"
    DataProviderKey="Sandicor - San Diego" SampleData="Ranch" />
    </operation>
    <operation id="MultiReplace" type="DataMasterPlus.Operators.MultipleReplaceOperator">
      <OperatorDefinition OutputSeparator="" ParseCharacter="" DataIsList="0">
        <ConfigurationSettings ExposeConfiguration="0" ConfigurationLable="" />
        <REPLACEMENTDEFINITIONS>
          <REPLACEMENT StringToReplace="Ranch" ReplacementString="1 Story" />
          <REPLACEMENT StringToReplace="Colonial" ReplacementString="1 Story" />
          <REPLACEMENT StringToReplace="Victorian" ReplacementString="2 Story" />
        </REPLACEMENTDEFINITIONS>
      </OperatorDefinition>
    </operation>
    <OperatorParameterLink parentid1="Architectural Style"
    parentid2="MultiReplace" Name1="Architectural Style_Out" Name2="Value1" />
    <Inputs>
      <Input id="Architectural Style" Name="Architectural Style" parentid="Architectural Style" />
    </Inputs>
    <Outputs>
      <Output id="Out1" Name="Out1" parentid="MultiReplace" />
    </Outputs>
</executionplan>
```

FIG. 21

```xml
<executionplan id="TotalAboveGradeBathrooms">
    <operation id="Bath Count Formattable"
    type="DataMasterPlus.Operators.DataProviderOperator">
      <OperatorDefinition DataFieldKey="Bath Count Formattable"
    DataProviderKey="Sandicor - San Diego" SampleData="2.0.1.0">
        <executionplan id="Bath Count Formattable">
          <operation id="BathFormat_1" type="DataMasterPlus.Operators.BathFormatOperator">
<OperatorDefinition bCombineQuarterBaths="False" bEnumerationChecked="False" Full=""
     Quarter3="" Half="" Quarter1="" bStandardChecked="True" StandardSeparator=""
     bCombinedChecked="False" bSeparateMultiples="False">
            <ConfigurationSettings ExposeConfiguration="1"
    ConfigurationLable="Bath Formatting" />
          </OperatorDefinition>
        </operation>
        <operation id="Baths Full_2" type="DataMasterPlus.Operators.DataProviderOperator">
          <OperatorDefinition DataFieldKey="Baths Full"
    DataProviderKey="Sandicor - San Diego" SampleData="2" />
        </operation>
        <operation id="Baths Half_2" type="DataMasterPlus.Operators.DataProviderOperator">
          <OperatorDefinition DataFieldKey="Baths Half"
    DataProviderKey="Sandicor - San Diego" SampleData="1" />
        </operation>
        <OperatorParameterLink parentid1="BathFormat_1" parentid2="Baths Full_2"
    Name1="FullBath" Name2="Baths Full_Out" />
        <OperatorParameterLink parentid1="BathFormat_1" parentid2="Baths Half_2"
    Name1="HalfBath" Name2="Baths Half_Out" />
        <Inputs>
          <Input id="Full" Name="Baths Full" parentid="Baths Full_2" />
          <Input id="Half" Name="Baths Half" parentid="Baths Half_2" />
        </Inputs>
        <ConstantInputs>
          <Constant operationid="BathFormat_1" inputid="Quarter3Bath" Value="0" />
          <Constant operationid="BathFormat_1" inputid="Quarter1Bath" Value="0" />
        </ConstantInputs>
        <Outputs>
          <Output id="Out1" Name="Out1" parentid="BathFormat_1" />
        </Outputs>
      </executionplan>
     </OperatorDefinition>
    </operation>
    <Inputs>
      <Input id="Full" Name="Full" parentid="Bath Count Formattable" />
      <Input id="Half" Name="Half" parentid="Bath Count Formattable" />
    </Inputs>
    <Outputs>
      <Output id="Out1" Name="Bath Count Formattable_Out"
    parentid="Bath Count Formattable" />
    </Outputs>
</executionplan>
```

```xml
<executionplan id="Address2">
<operation id="City_1" type="DataMasterPlus.Operators.DataProviderOperator">
<OperatorDefinition DataFieldKey="City" DataProviderKey="Coastal Realtors MLS" SampleData="Salisbury" />
</operation>
<operation id="TextMerge_1" type="DataMasterPlus.Operators.TextMergeOperator">
<OperatorDefinition Separator=", ">
<ConfigurationSettings ExposeConfiguration="0" ConfigurationLable="" />
</OperatorDefinition>
</operation>
<operation id="State_1" type="DataMasterPlus.Operators.DataProviderOperator">
<OperatorDefinition DataFieldKey="State" DataProviderKey="Coastal Realtors MLS" SampleData="MD" />
</operation>
<operation id="TextMerge_2" type="DataMasterPlus.Operators.TextMergeOperator">
<OperatorDefinition Separator=" ">
<ConfigurationSettings ExposeConfiguration="0" ConfigurationLable="" />
</OperatorDefinition>
</operation>
<operation id="Zip_1" type="DataMasterPlus.Operators.DataProviderOperator">
<OperatorDefinition DataFieldKey="Zip" DataProviderKey="Coastal Realtors MLS" SampleData="21801" />
</operation>
<OperatorParameterLink parentid1="City_1" parentid2="TextMerge_1" Name1="City_Out" Name2="Value1" />
<OperatorParameterLink parentid1="State_1" parentid2="TextMerge_1" Name1="State_Out" Name2="Value2" />
<OperatorParameterLink parentid1="TextMerge_1" parentid2="TextMerge_2" Name1="Out1" Name2="Value1" />
<OperatorParameterLink parentid1="Zip_1" parentid2="TextMerge_2" Name1="Zip_Out" Name2="Value2" />
<Inputs>
<Input id="City" Name="City" parentid="City_1" />
<Input id="State" Name="State" parentid="State_1" />
<Input id="Zip" Name="Zip" parentid="Zip_1" />
</Inputs>
<Outputs>
<Output id="Out1" Name="Out1" parentid="TextMerge_2" />
</Outputs>
</executionplan>
```

FIG. 23

SYSTEMS AND METHODS FOR SEARCHING FOR AND TRANSLATING REAL ESTATE DESCRIPTIONS FROM DIVERSE SOURCES UTILIZING AN OPERATOR-BASED PRODUCT DEFINITION

CROSS-REFERENCE TO RELATED APPLICATIONS

This application claims the benefit of each of U.S. Provisional Application No. 61/410,848, filed Nov. 5, 2010, U.S. Provisional Application No. 61/439,835, filed Feb. 5, 2011, and U.S. Provisional Application No. 61/463,356, filed Feb. 16, 2011, each of which is incorporated by reference in its entirety.

BACKGROUND

The appraisal industry originated from a need to valuate real property, such as surrounding the sale or insurance of a home, building or other improvement to land. The traditional process, as shown in FIG. 1, involved an individual called an appraiser 14, whose assignment it was to attribute a value to a piece of property, while possibly verifying the characteristics of that property in the process. To perform this function the appraiser 14 would receive a description of property 12, minimally identifying the property to appraise the value of, but preferably also describing the attributes of the property such as the type, area, style, etc. Property description 12 might also include an inspection report. Property description 12 might also be a simple appraisal order containing an identification of a property, such as an address. Before the widespread use of computers and networking, the appraiser 14 would ordinarily consult real estate records 11, whose usual location was at the county land records office. Records 11 would contain descriptions and amounts of the sale of properties within a given locality, which appraiser 14 could compare against a property description 12 to assign a value. Appraiser would identify properties within records 11 that were comparatively close to property description 12, resulting in the identification of "comparables". Upon a sufficient number of comparables, appraiser 14 would attribute a value to the property of property description 12, and release an appraisal report 15 for the requesting party.

In can be appreciated that the appraisers of yesterday spent a significant amount of time in the land records office finding comparables, which was inconvenient. Therefore, it was known to keep a collection of files 13 which the appraiser could refer to to reduce his workload and time in finding comparable properties. Other files might also be consulted, including property inspection reports. However, the appraiser 14 was still required to visit records 11 to update his knowledge of sale values, with fluctuations in the market and the devaluation of currency due to inflation.

The technology of appraisals has improved over the years, such that it is no longer necessary to visit the land records office, nor to keep extensive on-site files containing comparables. However, a desirable appraisal may need to consult with a number of data sources, which are now described.

The traditional source of public records remains available to the appraiser. Unfortunately, the history of these public records varies from locality to locality, such that there is no unified repository that can be consulted. In many cases, these public records are managed at the county level. Often there is one office that may be consulted housing the land records of the county, where transactions may be recorded. Even if that is so, however, many records regarding land may be located elsewhere. There may be a county recorder office charged to "record" all information in the public records requested or required by the general public, including property owners, lenders, court systems, etc. Appraisal-related information obtained from this office typically includes legal descriptions of each individual property parcel in its county, plat maps showing those parcels, and information regarding ownership and interest therein. Recorded in this office may also be information regarding transactions regarding land, such as prices paid.

There may also be other county offices that an appraiser might consult. One of these might be a county assessors office, which is typically tasked with keeping informational records on the land parcels in the county, which information might include an address, the year a structure was built, and various physical characteristics of land and buildings. This office is also typically tasked with periodically estimating a value for parcels, usually annually, which might be of interest when conducting an appraisal. This need not be the only office of this kind: in Texas, for example, there are "valuation districts" that are located within larger county jurisdictions that serve the same function. Other county offices that might manage information useful in the performance of an appraisal might include a county treasurer office, often calculating property values in the collection of property taxes, or other offices that perform land planning, building, zoning, auditing, engineering, surveying, or the management of other records regarding health, public safety, and technological improvements such as for communications.

At the city level, records of interest in appraisal are also kept. These typically involve building codes, zoning histories, subdivision approvals, and building and land development rules, regulations and policies, all of which are managed by each individual city. Many cities have various engineering policies, procedures and documentations that govern or affect the development and general use of real property. As well as written records, there may be various kinds of maps to be consulted. Cities also keep records specific to properties concerning actions, permissions and permits granted or denied. For example, these might include building permits and related documentation, inspection records, and zoning authorizations and history records. It is not uncommon for medium or larger cities to have their own technology department to manage their various public records. In those places with townships, that can also increase the locations where appraisal-important information may be found.

Real-estate related information may be also be found at the state level. This can involve taxing commissions, departments of transportation, health, economic development, agricultural departments and census bodies.

Last mentioned herein are federal offices that manage information that might affect the appraisal of a property, including offices related to census records, health, transportation, lending and financial concerns, the IRS, agriculture, interior and the military.

There are available to real-estate agents a Multiple Listing Service (MLS), which allows such agents to enter information about specific properties that are offered for sale to the public. Such services may also keep information about properties that have sold, are currently under contract, or for which contracts have expired. Systems supporting MLSs have become the backbone of the real estate industry and are used heavily, utilizing electronic platforms that are generally large and sophisticated. Real estate appraisers have been allowed essentially read-access to the data contained in these MLSs. Although these do provide information useful in the performance of appraisals, these are restricted in their locality both geographically and by organization, as it is local boards of realtors that ordinarily own or otherwise participate in correspondingly local or at most regional MLSs. At the present time, there are some 700 to 900 local MLSs around the country. Each MLS is typically well established, having its own rules, processes and databases. There are standards for these promulgated by the National Association of Realtors, but the degree and level of compliance varies. Each system has its uniqueness, with different data structures and data elements that reflect the local or regional characteristics of the properties described. While most of these system have export capabilities, these have their limitations in extractions, formats and presentations to appraisers, who ordinarily find that much of the information received requires further manual processing.

Appraisers also have available to the commercial data service companies, which use their own proprietary platforms, database constructions and delivery systems. For example, such a company might purchase data from public records, MLS data, individual appraisers and other sources, merge it, combine it, repackage it and then resell it in a large block of data. Appraisers have made use of these services, although the information has been organized in such a proprietary nature that appraisers have found manual refinements to be required. Some appraisers have attempted to organize their own services in a local or regional co-op, but these have not solved the problems with non-standardizations of data formats.

The final source to be mentioned that an appraiser might rely upon is his own files. In the process of completing appraisals, appraisers typically keep data on the subject properties. This data source is usually kept in databases and file structures unique to the individual software package purchased from one of the five or six supplying vendors. The data in an appraisers file may or may not have been manipulated to meet personal style or structure, and cannot be relied upon without familiarity of this source by the appraiser desiring use of it.

BRIEF SUMMARY

Disclosed herein are systems capable of searching, receiving and conglomerating the data from databases structured in varying formats containing real estate data, translating the data received into a common format using a rules or other structures tailored to the format from which the data originated. These translations may be performed through the execution of pre-defined rules referencing data tags used within the system and/or within the originating databases. These rules may be constructed in a simple form, but may also be structured in a hierarchy or a class-based structure whereby one rule depends upon the output of another rule for its input. Data sources can be prioritized or merged where the same property-related information is presented in more than one source. Rules, appropriately crafted, can overcome the non-standard ways in which properties are described, allowing for uniformity in the comparison and distribution of property descriptions in appraisal. Map definitions containing rule sets can be utilized, those definitions being crafted for a particular use, such as for reports to a particular consumer or in customizations for a particular user or operator. Such systems may be utilized in the course of real estate appraisals, or in search reports for properties, extending the range of input information across databases of differing formats. Detailed information on various example embodiments of the inventions are provided in the Detailed Description below, and the inventions are defined by the appended claims.

BRIEF DESCRIPTION OF THE DRAWINGS

FIG. 6 shows the textual definition of two operators in the exemplary rule-based structure.

FIG. 14 shows the main page for the forms customization interface of the exemplary Formatter program.

FIG. 15 shows a sample screen for selection and prioritization between two data sources of a field in a final report.

FIG. 16 shows a textual representation of an exemplary execution plan.

FIG. 17 shows another sample screen for selection and prioritization between two data sources of a field in a final report.

FIG. 18 shows a sample screen in the exemplary Formatter for the selection of formatting for values that might be encountered on retrieval from data sources.

FIG. 19 shows the textual representation of an execution plan containing formatting selections as replacement strings for several architectural styles.

FIG. 21 shows the textual representation of a sample execution plan for a custom tag.

FIG. 23 is a textual form of a sample execution plan in the exemplary rule-based structure.

Reference will now be made in detail to particular implementations of the various inventions described herein in their various aspects, examples of which are illustrated in the accompanying drawings and in the detailed description below.

DETAILED DESCRIPTION

Computer-Based Processes

Figure 1:
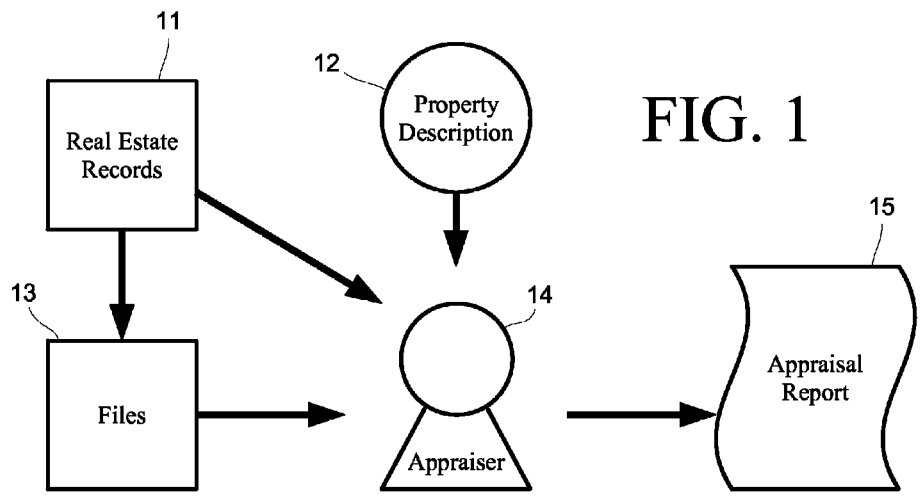
FIG. 1 illustrates the typical historical process used in land appraisals.
Figure 2:
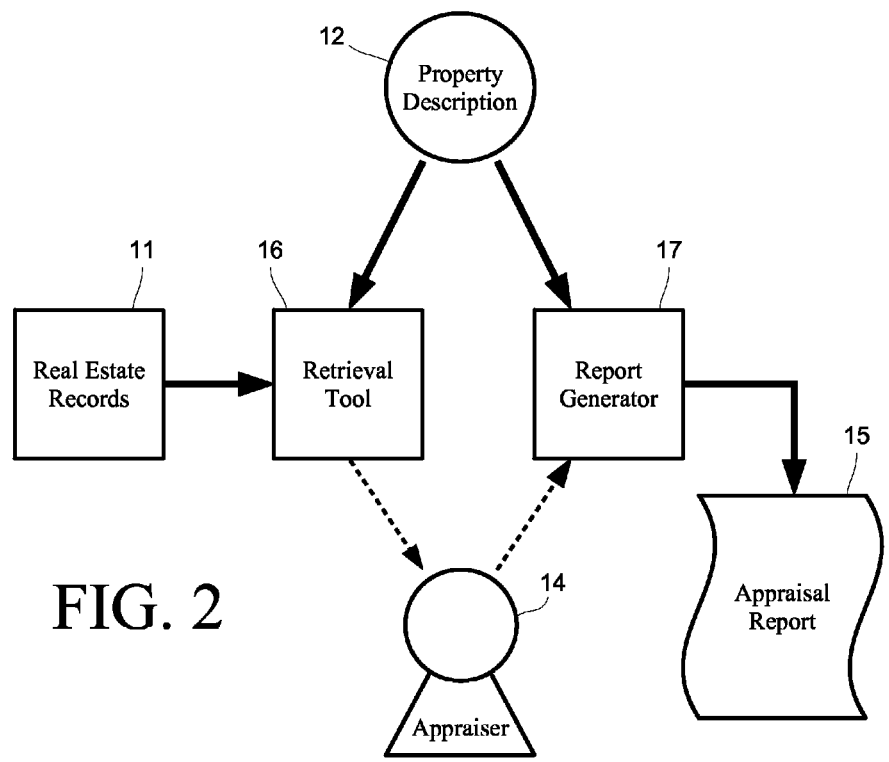
FIG. 2 shows a modern appraisal system utilizing computing resources.

Recalling the historical appraisal process, and turning now to FIG. 2, as computers became available it became possible to perform a search upon records 11 in data sources (such as those listed above) through the use of a retrieval tool 16. For example, records 11 could be made available by a land records office, and distributed in computer-readable form in a database of some kind. In such cases, retrieval tool 16 was configured to access a local database, searching it for possible comparables for presentation to the appraiser 14. In other cases, records 11 are maintained off-site, made available through network access such as over the Internet, such as for many MLS systems. A retrieval tool 16 can also be constructed to access records 11 over a network connection, utilizing whatever interfaces are made available to subscribers or to the public. The sources of information that can be made available in a database are not limited to county land records and MLS records, but also includes records of county assessors, county recorders, treasurers, other appraisers, builders, developers, and FSBO (for sale by owner) listings, among other data sources including the ones listed above.

To use a retrieval tool 16, a property description 12 is provided for the purpose of performing a search. This description may include such things as mentioned before, size, number of floors, year built, etc., and may also include the location or locality of the property. The retrieval tool 16 may then search through records 11, which search may be performed either within a locally-hosted database or by a search facility in connection with a network access point to the records, such as a remotely operated server.

Upon completion of the search, an appraiser 14 may be presented with comparables information, which he may incorporate into a report. To that end, appraiser 14 may enter such information into a report generator 17, which may also accept the property description used in the search. In prior methods, report generator was simply a word processor operated by the appraiser, from which the report 15 was generated. Software now exists that provides relief for some of this data entry, but the existing systems maintain a limited functionality with respect to the records sources that can be utilized, such as a source of records 11. Additionally, the existing software provides no more than simply copying of data, requiring the review and editing of the appraiser 14 for a final report.

Exemplary Integrated Process

Figure 3:
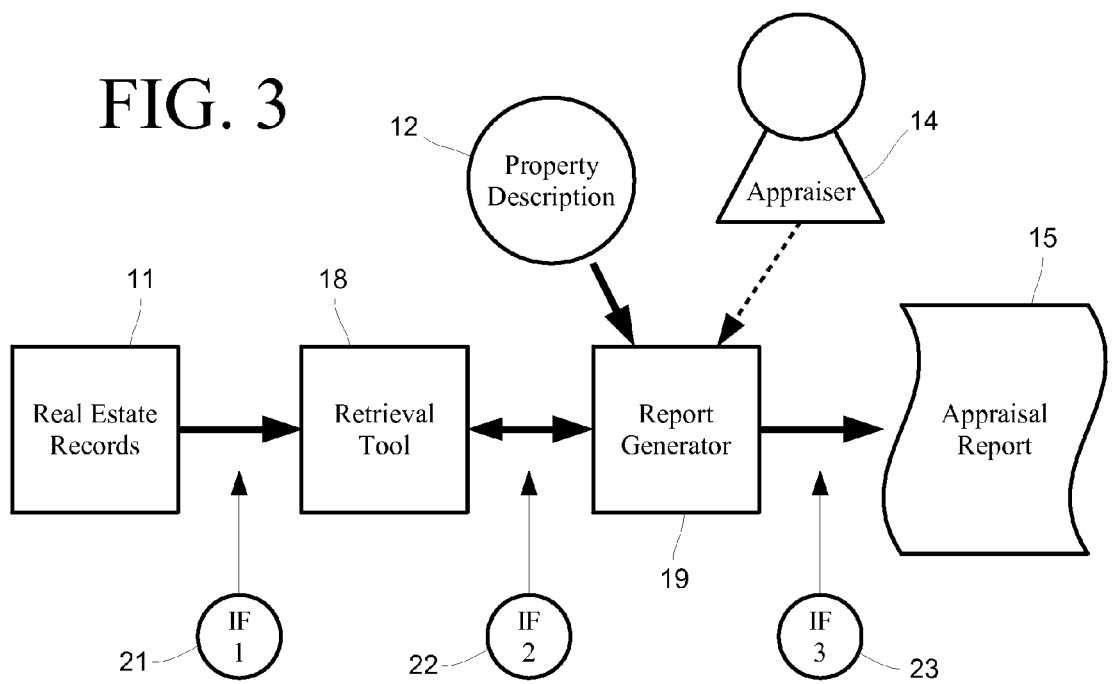
FIG. 3 shows the elements of an integrated appraisal system utilizing a retrieval tool and a report generator.

FIG. 3 depicts an integrated process permitting the flow of data from records 11 through the entire system to an appraisal report 15, which has been elusive in practice. The process of FIG. 3 has several advantageous features, which have been difficult to achieve for reasons described below.

The stage of moving data from real estate records 11 to a retrieval tool 18 has been successfully performed, for example in the DataMaster product available from Market Data Service LLC of Utah, described below. Retrieval tools have successfully presented persons 14 with data from public records 11, which persons have been able to enter into a report generator 19. The relocation of data retrieved by a tool 18 into a report generator 19 has not been easy, for a number of reasons.

The first of these reasons is a lack of standards between land records offices and in the community of appraisers. Each office and each appraiser is free to utilize their own format, which produces interpretation problems to a report generator 19. Although it might be possible in some small instances for a generator to be constructed which automatically interacts with a single source of records, this has not been a cost-effective solution. Even within a single source, inconsistencies usually exist which prevent the straight and reliable transfer of information from a record to a report 15.

Leaving aside for a moment the difficulties of creating an interface between a retrieval tool 18 and a report generator 19, it can be seen that there are three base interfaces in this system, which are: the interface 21 between the retrieval tool and the records being retrieved, the interface 22 between the report generator and the retrieval tool, and the interface 23 between the report generator and the producer of the appraisal report 15. In one system, the retrieval tool 18 accesses records 11 over a network interface, and the generator 19 utilizes a printer interface in the generation of a report 15. Alternatively, a report need not be printed, but might merely be recorded to a storage device. Retrieval tool 18 may also function as a search tool, searching for property descriptions for evaluation. The interface between the retrieval tool 18 and the report generator 19 in this example is by way of an application execution interface: the retrieval tool 18 is a library or object code to generator 19, both running on the same computing platform. In another system, the retrieval tool is an independent object, called by report generator 19 and returning an export file. In another system, the retrieval tool 18 is an application residing on the same platform as generator 19 and returning an export file. In another system, report generator 19 is a web application not hosted on the same computing platform at tool 18. Thus any of interfaces 21, 22 and 23 may take many forms and be a local or a network interface, and likewise an appraisal report 15 need not be a hard-copy, but may also exist in an electronic form digitally identified with the appraiser 14.

Figure 4:
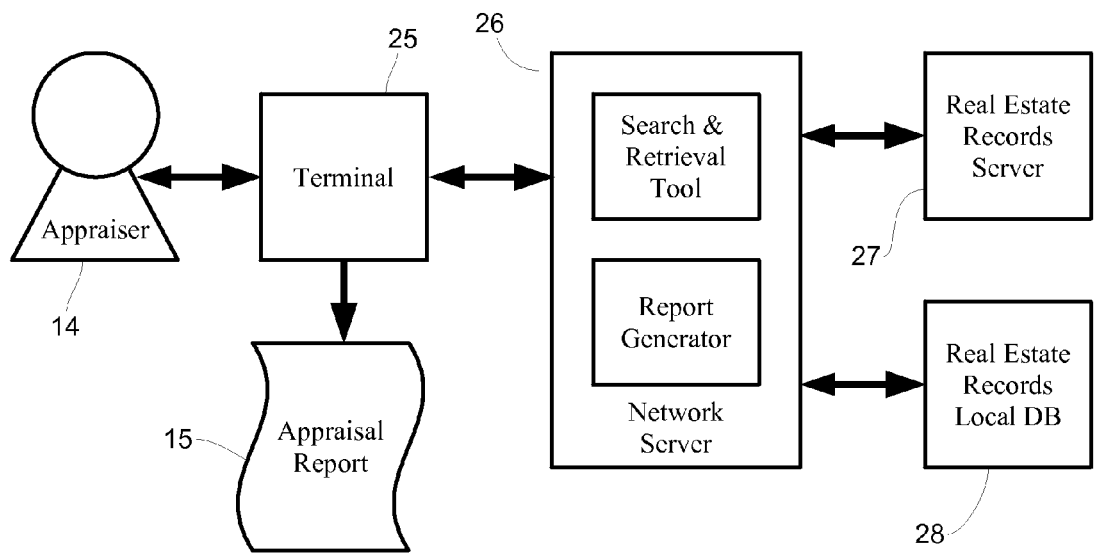
FIG. 4 shows the elements of another integrated appraisal system providing for terminal access by an operator.

For example, looking to FIG. 4, an appraisal process may utilize a server of some kind, such as over the Internet. In this example, the retrieval tool and the report generator reside on the same network server 26, accessible over a terminal 25 made available to an appraiser 14. The appraiser operates a property search from terminal 25, which may be through the use of a web browser operating on terminal 25 and an HTML server operating at server 26, for example. The search and retrieval tool on server 26 could access data located at the server 26 in a local database 28, but in order to access the most current information the tool may access a real estate records server 27 operated by the land records office or another source of land information such as an MLS. Upon performing a search, server 26 may return the details of properties of that search to terminal 25 for the review of appraiser 14. The appraiser may then select a representative group of comparables for the report 15, which is generated and delivered to terminal 25, for example through reception at an HTML browser on terminal 25. Thus, the interfaces between components exemplified by interfaces 21, 22 and 23 may differ widely depending upon the needs, capabilities and desired arrangements of its users.

Multi-Source Integrated Process

Figure 5:
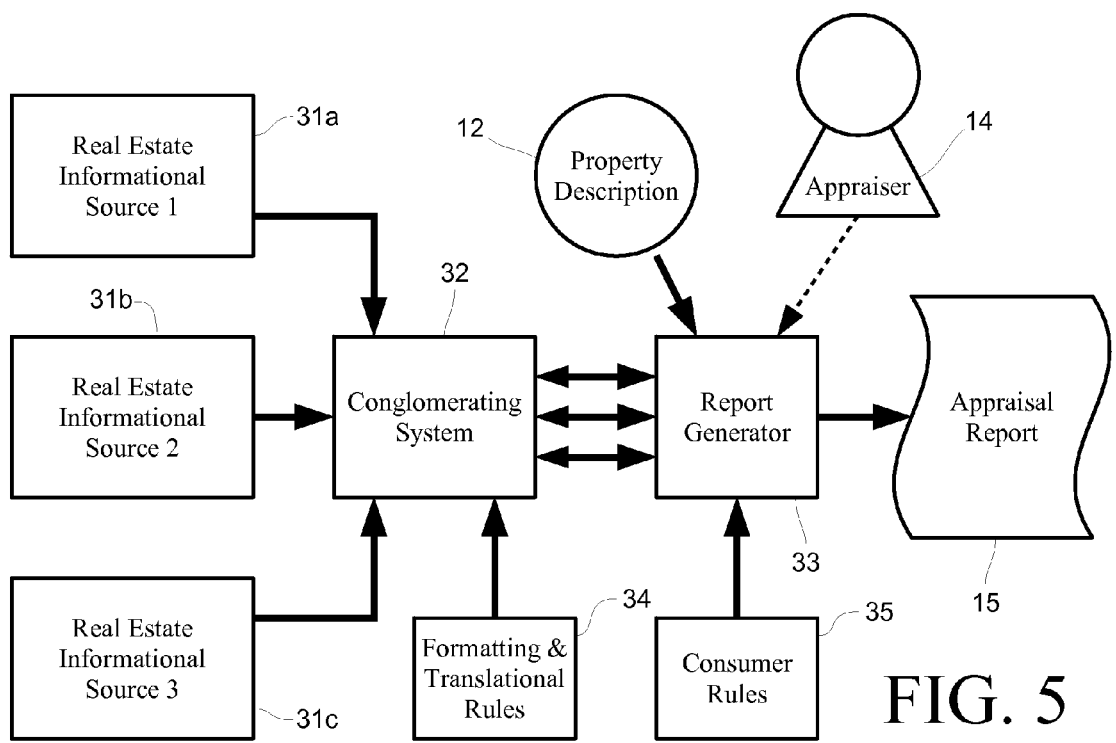
FIG. 5 shows a novel integrated appraisal system capable of receiving and conglomerating real estate information from a plurality of sources through the use of formatting and translational rules.

Now continuing the discussion with FIG. 5, it has become possible for a multiple-source system utilized by an appraiser 14 to be operated. Recognizing that each source, here 31a, 31b and 31c, has its own format and data arrangements, the problems of the interpretation of data between a retrieval tool and a report generator are exacerbated. Sources that might be used include a Multiple Listing Service (MLS), public records, and appraiser data sharing co-operatives. Although the discussion below speaks of the operation of a system with local computing resources and remote data sources, there is nothing prohibiting the operation of the same kind of system remotely such as through a terminal as shown in FIG. 4.

In the past systems discussed above, appraisers have used various software tools to pull data from various sources, manually transferring data between them onto an appraisal report. In the system of FIG. 5, a new component is provided, which is a conglomerating system 32 that integrates and interprets the data in the various sources for use in a report generator application 33. The identification of the sources to be used are received beforehand in connection with the operation of the system. Remote sources can be interacted with through a network, but local sources might also be used, for example through a locally-installed program through interprocess communication. Again, conglomerating system might be local or remote, communicating with an application 33 through many ways including an application interface or by a network protocol. In the course of accessing the sources, search criteria will ordinarily be sent, which criteria will represent a class and locality of a property which is to be appraised or compared against. Criteria might also include a value, a sale price, a property market, a geographical region or a combination of these as desired. The sending of criteria will be done in a format compatible with each source, the response returned by each source being a property description or reference thereto whereby a description may be retrieved in conformance with the sent criteria. The criteria sent to each source may also be translated to match the capabilities and format of that source; for example a criterion might be omitted from a source that does not respond well to it.

The conglomerating system is functional to translate and interpret the information returned from queries to the various sources into a common format, providing a unified set of information to application 33. This may be performed through the reading and application of translational rules for an identified source, which will become more apparent from the discussion below. If data tags are available at the source, they may be used as references to such rules to provide identification and extraction of the characteristics of subject properties.

Provided with the conglomerating system 32, or alternatively at generator 33 or even another location, are formatting and translational rules that provide for standardization between different sources of information 31. These rules may be identified with a particular source, or alternatively may provide for auto-detection of standardization need. These rules may take the exemplary forms described below, or another form in accordance with the particular configuration of system 32 or other components. Within a system will exist a rule execution engine, which in the configuration of FIG. 5 could be modified to locate the engine either at conglomerating system 32, report generator 33, at both locations or somewhere in-between. Such a rule execution engine may operate to apply specific rules to search terms and the terms found within the real estate informational sources 31.

Thus formatting and translational rules 34 may be applied to information from sources 31 being delivered to report 33. Other rules 34 may be applied in the course of applying search terms to sources 31, being formatted and/or translated from a property description 12 or from appraiser 14. Rules 34 may also include default sources to use where information exists in more than one of sources 31. Priority may be given within rules, which may specify one source having priority, giving priority on the basis of which data is most recent, or on the basis of which data is more reliable. Priority may indicate the elimination of a non-prioritized source, or an annotation might be provided including some or all of both sources, with the prioritized data being more prominently displayed. The application of rules may also be conditional, for conditions where a rule should be included or excluded. Rules may be simple or complex. As spoken of further below, rules may include inputs, outputs, operators, variables, exceptions, code for execution, and other features as needed to make application of a rule possible within the computing system.

Although rules 34 may be applied generically to the generation of reports, other rules 35 may be selected and applied to provide customization of reports for particular consumers. These rules may be stored at the appraiser's location if desired, however these rules may also be located in other locations, such as through the use of network access. Consumers in this context may mean a particular lender, such as a bank or governmental lending organization such as Fannie Mae or Freddie Mac. These may set forth standards for their own consumption, which rules 35 may provide conformance to. Note that with the absence of rules 34 and rules 35, appraiser 14 bears the burden of making appropriate corrections to the information to and from informational sources 31.

Consumer rules may be applied with priority over general rules, either modifying the output of the general rules or replacing them altogether. If the nesting of rules is engaged, as described below, both modification and replacement are possible.

Automated Custom Formatting

Although prior systems were capable of accessing sources of real estate information for appraisers, these systems were focused on presentation of the information to an appraiser, and in a few cases, very simple transfers of information for the generation of an appraisal report. These systems left the final format of the information in the report solely in the care of the appraiser generating the report, who was left to examine the terms of the informational sources, and copy, format and translate these according to his best work and discretion.

Herein are presented rules, useful to apply formatting and translational corrections in the standardization of informational sources, and in conforming the informational sources to a consumer such as a lending organization or an individual appraiser.

The difficulties in the non-standardization of real estate data are many. For example, the Phoenix market uses a different set of terms than the Denver market; a home that might be described in Phoenix as adobe style would have a different label in Denver, thus making a comparison between homes in those cities difficult. Likewise descriptions of properties between databases, or even within the same database, may use nonstandard forms. For example, a property having a garage might include the text "garage", but it might also include other abbreviated forms such as "gar.", "gar", "g." or even just "G". Aspects of properties may be listed in different orders, or using different terms. For example, bathrooms might be listed in one database as being full, ¾, ½ etc. In another database, the existence of a bathroom of ½ or greater might only be noted. Thus one database may include more detail than another.

Consider a home having one full bath, one ¾ bath, one half-bath, and one quarter bath. Such might be abbreviated "1F1T1H1Q", "2F2H" (rounding quarters up to the nearest half), "1.1.1.1" (noting the presence of each and every bath), or "2.5.5" (counting the number of baths over ¾, followed by a 0.5 for each additional ½ or ¼ bath.) Likewise, a data source might present this data in four different fields, needing to be translated into a different format. These abbreviations might exist in any database, may require some interpretation and translation as comparables, and may also require translation for use in a final appraisal report.

In another example, within a regional database the style of houses might be described as ranch, colonial, Mediterranean, Victorian, Spanish, and split-level. A lender may only accept the number of stories of a building, requiring a translation from the noted style. Such translations may rely upon one element within a database, more than one element, or even more than one element from multiple databases depending upon the circumstances.

In another example, different units may be used for measurement. Measurements in square feet, acres, meters and many others may need to be converted to allow for comparison or for insertion into an appraisal report destined for a particular customer.

Rules, appropriately crafted, can overcome the non-standard ways in which properties are described, allowing for uniformity in the comparison and distribution of property descriptions in appraisal.

Merging of Data and Prioritization of Data Sources

It is sometimes the case that the data of one source is more reliable or more detailed than another. However, this holds true only with respect to subsets of particular descriptive types within databases. For example, one database may be more reliable with respect to certain elements, while a second database may be more reliable for other elements. This was not appreciated in prior appraisal systems.

In other cases, elements within the same database may be more reliable than another. For example, a list price may be less reliable than a sale price for valuation of properties. Rules may be constructed that give priority to the elements of differing databases, or elements within the same database to ease the burden of consideration by an appraiser.

In some instances an appraiser may wish to include data from two data providers on a report line. For example, this might be desired where a lender wishes a verification of some data, such as the lot size of a property. In other cases an appraiser may wish to use one data source over another, but with notification that different sources do not match, such as in an exceptions report. Thus rules can be crafted to prioritize a kind of data in one database over another, or to prioritize data within the same database in the merging thereof, or to create a supplementary or annotative format for the convenience and use of a consumer.

Map Definitions and Application Thereof in the Merging and Formatting of Data

As described in connection with FIG. 5, rules may be separated between generalized and consumer rules. These rules may be fashioned within a map definition, which map organizes the rules into a better-functioning structure. Map definitions are particularly useful as a container for rules, for the organization and transfer of rules in predefined application settings.

In one example, a map definition may include rules and operators for a software provider, for use with selected informational sources by a majority of the software's users. These rules may be tailored to a selected set of informational sources, which sources may be selected by the user/appraiser and the appropriate rules applied thereto. If the appraiser or other operator is sufficiently skilled, he might modify these rules and operators for his own informational sources, should he prefer some that are not included by default. Such a modified operator-based map definition can supply the means for persons within an office to use informational sources not available more widely, modify default rulesets where a different treatment of incoming information is desired, or supply a custom translation of data items in the course of preparing reports.

Also in that example, that map definition might also include rules created by the appraiser or his team, customized according to his needs and wishes. Thus, should an appraiser do a substantial amount of work for a particular customer, he may know that customer's preferences and build a rule set that applies those preferences automatically. For example, an appraiser might also need to set up a separate set of rules for different clients such as Bank X or Bank Y. In another example, rule sets could also be created to handle differences in appraising different price tiers of property such as homes priced up to $400,000 and other homes of larger price. Such rule sets might be incorporated into a map definitions for particular customers and application, which may be retained at his site for further use or transmitted to others for their convenience as well.

A map definition might also include rules for particular consumers. For example, the software provider may include rules specifically for Freddie Mac or Fannie Mae, apart from the generalized formatting and translational rules otherwise provided, perhaps in a separate map definition. Alternatively, the consumer might supply its own map definitions for use in the submission of reports made to it.

The updating of map definitions may be by way of a file distribution: that is the software vendor may release new map definitions and new rules from time to time, either as improvements or as conditions change in the business. The updating of a map definition need not require an update to the software executables or other parts of the product; thus making the software product updatable without a complete redistribution. The updating of a map definition may be by way of the release of a file to users to copy to a particular location, or preferably the software itself may include an update utility which makes any necessary changes to the map definition files over a network or through files identified by the user. Should an operator use a remote formatting engine, his own map definitions can be supplied over the network used to access it. Likewise, a consumer might also release a map definition file for appraisers dealing with it, which could be distributed by the software vendor or by the consumer itself. Ideally, any custom rules created by a user/appraiser of the software should be maintained through updates to other rules, which may be conveniently by keeping those user rules apart in a separate file. Thus rules and operators therewith may be subdivided within a map definition according to their generality and portability, and thus be organized into separate containers such as files for distribution as desired.

As will become apparent from the discussion below, the rules in a map definition may be scripted and saved in a way so that the rules may be nested within other rules. By nesting the rules certain complex rules will only need to be defined once.

Preferably, the software includes an editing function (such as shown in the screen shots described below) so as to permit users to change consumer rules, and perhaps other rules, without editing map definition files themselves. In this way the software vendor can avoid requiring that the user/appraiser know the particular format of the rules, while at the same time permitting them the customizations they desire.

Consumer Profiles and Applications Thereof

With consumer-based rules, the assemblage of consumer-based map definitions become possible. A set of rules may be provided for a particular consumer, and a choice given to the user/appraiser as to what profile of custom rules should be applied, if any. Such a choice might be retained across sessions or recorded as a default, if desired. The selection of a choice may also determine the entry of certain inputs into an appraisal report, which inputs may be determined by consumer rules as described above.

A consumer could create it's own set of consumer-based map definitions based upon the needs of various customers or regulatory bodies. For example, Freddie Mac or Fannie Mac may require that report fields present data in a specific way, apart from the generalized formatting and translational rules otherwise provided. Similarly, a consumer could supply a destination with its map definition, and a report produced could be delivered to that destination as requested. A consumer could supply a map definition for each such body that it deals with, or merely one definition if it assumed the processing and final delivery. It is to be understood that the existence and use of a consumer-based map definition need not prevent the use of operator-based rules and map definitions: other non-conflicting rules can co-exist. Thus, a consumer-based map definition might include a set of sources of real estate information, which might be supplemented by the operator at the time of use. Consumers might likewise specify what data tags to use in the identification and extraction of property characteristics: assuring that the information they desire to receive is provided through a supplied map definition. Should conflicts arise between a consumer-based and an operator-based map definition, priorities can be given to resolve the conflict. Priorities can be defined by default, or be declared in the map definitions themselves.

Versions of Existing and New Products

In the residential home appraisal industry real estate appraisers get their data from a variety of data sources. These sources include but are not limited to Multiple Listing Systems (MLS), Public Records, and appraiser data sharing co-operatives. The appraisers use the data from these various data sources in the appraisal reports they create. These appraisers have various software tools to pull data from the various sources, but there has not been a tool to allow appraisers to fully customize and merge the data the way they would like it to show in their appraisal reports.

As noted in the introduction, appraisers have relatively few software tools to pull data from the various data sources. There has not been a tool that allows appraisers to fully customize and merge the data the way they need it to be and that will allow them to format the data the way they want in their appraisal reports. In 1995, Market Data Service LLC developed its DataMaster™ series of software products designed to assist appraisers in interfacing with various data sources and then formatting and merging the data and sending formatted data into an appraisal report. To do that, an appraiser would use a process including the following steps. First, an appraiser would search for data he would use from this local MLS. Next, he would export data found to his computer. Then, the DataMaster product would recognize that export file, locating the MLS number of each entry to be retrieved. That number would be supplied to the RETS server, following which the information for the MLS number would be retrieved. As necessary, DataMaster would then connect to a public records provider, send another message there and retrieve whatever public records information was available. DataMaster would then perform a processing step upon the information retrieved, presenting that processed information to the appraiser. The appraiser would then have the ability to change that information in various ways, and at the appraiser's command, that information would then be forwarded into the forms provided by other software packages the appraiser might have, such as those known as A La Mode, ACI, Clickforms, 3-Track and SFREP. Such a process involves a Multiple Listing Service, a RETS server, the DataMaster product, a DataMaster server, public records, and interfaces to other software packages.

That process can be improved in several ways. First, the data from several sources of real estate information can be merged and formatted for consumption. Second, where multiple sources are utilized, the selection of a default data source can be provided for where the same data or data applied to the same field in a report is available from more than one source. Third, where rules are used, a redefinition of those rules can be allowed for without a rebuild of the software provided, potentially modifiable by an appraiser apart from a software developer. Fourth, fields within a report can be customizable to allow for specific formats for a specific type of report.

The DataMaster Custom Format software tool (or simply the "Formatter") is a new developed program designed to merge and format data from one or more data sources. Looking to the architecture of FIG. 5, the Formatter is implementable within the conglomerating system and/or the report generator to use rules 34 and/or 35. The Formatter can take data from any number of data sources, prioritize the data, compare the data, format the data and then export a value or values that can be used by a program implanting the Formatter. The Formatter as designed can pull its definitions from an XML script document or other scriptable document type thus allowing the functionality of the Formatter to change as needed without rebuilding the software application. To that end, the Formatter may utilize a number of components including operators, operator parameters (or just parameters), execution plans, data providers, and map definitions, as will now be described.

The first component of the Formatter is called the "operator". An operator is made up of different "parameters", which parameters are broken into two main types: input and output. Input parameters are used to pass data into an operator and output parameters are used to pass formatted data out. (See FIG. 7) In the execution of the Formatter, an operator is designed to "Run" once all inputs have been initialized. When an operator runs it uses the supplied inputs and runs the operations on the supplied data as indicated by the instructions within the operator. If an operator successfully runs then it will populate its output with the resultant values.

Figure 7:
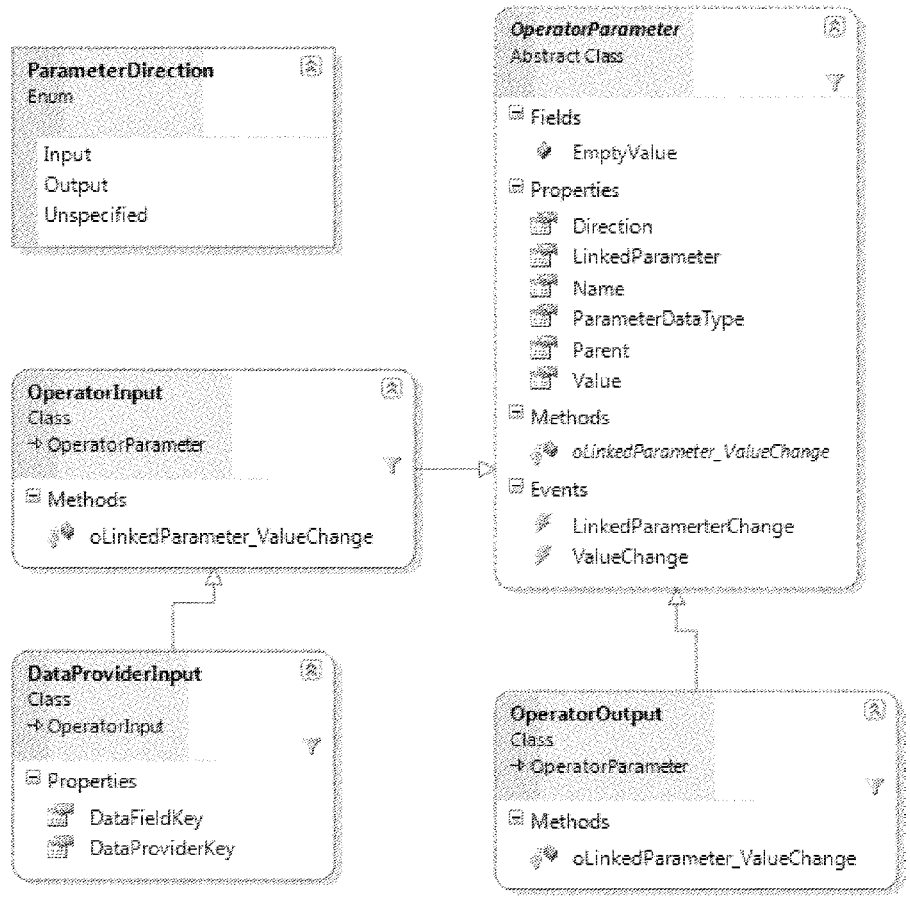
FIG. 7 shows the organization of an exemplary rule-based structure using parameters passed between operators.
Figure 8:
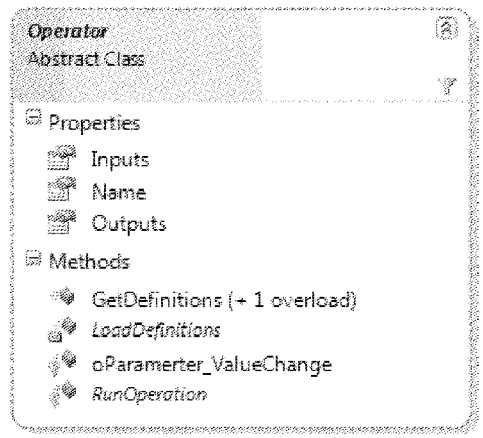
FIG. 8 shows the structure of an exemplary operator as an abstract class.

Continuing in FIG. 7, the operator object is an abstract class as depicted in FIG. 8, and is not directly implemented within an application. The operator class must be inherited by classes that are to implement the operator functionality thus allowing the Formatter to use different operators with various inputs, outputs, and functionality. An operator could be created that would inherit its base functionality from the operator class, yet be able to specify what types of parameters are required and what the functionality will be applied when the operation runs. For example: a multiplier operator (see FIG. 10) could be created that would define two inputs and one output; when the operation runs it could take its two inputs, multiply them together and use the result as the output value.

Operator parameters are used by Operators to pass data to and get data from them. As seen in FIG. 7, an operator parameter includes the following properties: a parameter direction, a linked parameter, a parameter data type, a parent operator, and a value. The parameter direction property is used to indicate the direction of the parameter, that is input or output. The linked parameter property provides a reference to another operator parameter that this parameter is linked to. The parameter data type indicates the data type that will be accepted or returned by this parameter. The parent operator is the operator that the parameter is a part of. The value property is the exposed property that can be used to get or set values for this parameter. When an operator parameter value is set or changes, the parameter fires an event notifying any linked parameters that the value has changed.

As seen in FIG. 7, another type of parameter is a data provider input parameter, which provide the entry points for data provided to the Formatter from data sources. The data provider input parameter object inherits from the input parameter object and as such can be used in place of a standard input parameter. The data provider input parameter has two additional properties which are DataProviderKey and DataFieldKey. These additional properties allow the Formatter to know how to load data to an operator from a data provider. The data provider key is a key for the data provider providing data for the input parameter. The data field key is a key for the data element or elements to be used for the input parameter. When new data is available from a data provider the data set is passed to the Formatter which can then pull the needed data elements to populate the data provider input parameters.

To make the Formatter flexible and provide for many possible custom formatting scenarios, operators can be linked in series. That is done by linking the output of one operator to the input of another. In the example of FIG. 6, one operator labeled PrefixOperator_1 prefixes text and a second operator labeled CapitalizeOperator_1 capitalizes text. Each has one input and one output. PrefixOperator_1.Outputs.Out_1 is linked to CapitalizeOperator_1.Inputs.Value_1. Here is the series of events that would occur from the instructions of FIG. 6 using the object model explained above: First, PrefixOperator_1.Inputs.Value_1.Value is set to "abc". Second, The PrefixOperator_1 is notified that all input values are present and the RunOperation( ) is called. During this operation "abc" is prefixed with "efg" to make "efgabc". Next, PrefixOperator_1.Outputs.Out_1.Value is set to "efgabc". Next, CapitalizeOperator_1.Inputs.Value_1.Value is set to "efgabc". Next, CapitalizeOperator_1 is notified that all input values are present and the RunOperation( ) is called. During this operation "efgabc" is changed to "EFGABC". Finally, CapitalizeOperator_1.Outputs.Out_1.Value is set to "EFGABC". Thus, two operators with different functionality can be used in series to modify the text in a very specific way.

Figure 9:
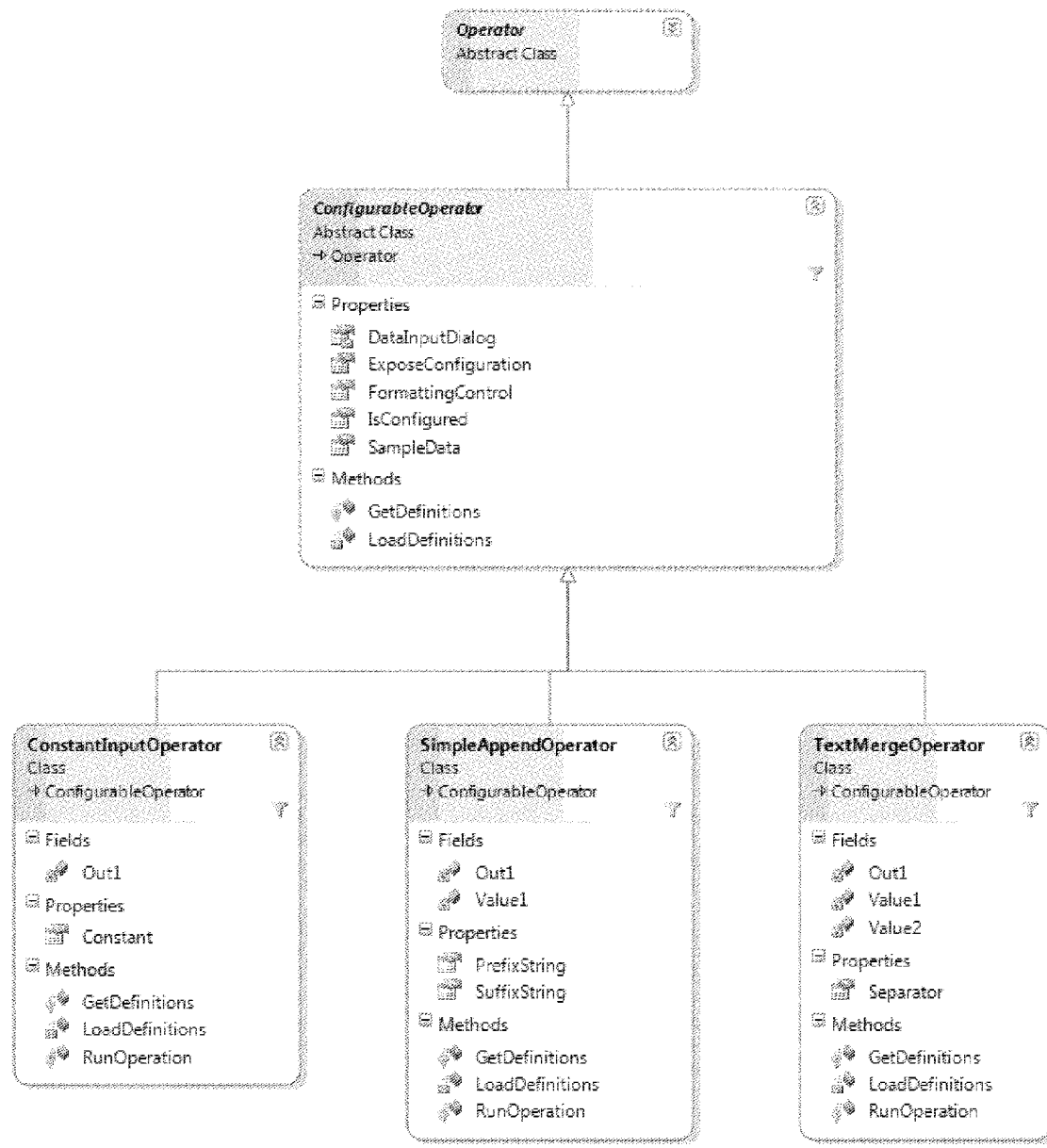
FIG. 9 illustrates the structure of a configurable operator in the exemplary rule-based structure.

Continuing further in explanation of the Formatter components, configurable operators: For some pperators there will need to be the ability for the user to change some of the functionality on the fly. Using the same example as above the prefix operator could be a configurable operator that would allow the user to specify the data to prefix the text with, such as in the example of FIG. 9. So rather than creating an operator for every possible text a user may want to use to prefix other text, one operator can be built that will expose the definition of the prefix text. This also allows the Formatter to implement the same operator but with different configurations that will meet the needs of the user. The configurable operator has to implement a configuration form that will display the exposed definitions of the operator. So, each operator implements a LoadDefinitions and GetDefinitions function that will set and get the definitions respectively for the operator. The definitions for the operator are saved to and retrieved from the MapDefinition file using XML or another scripting language.

Figures 10, 11:
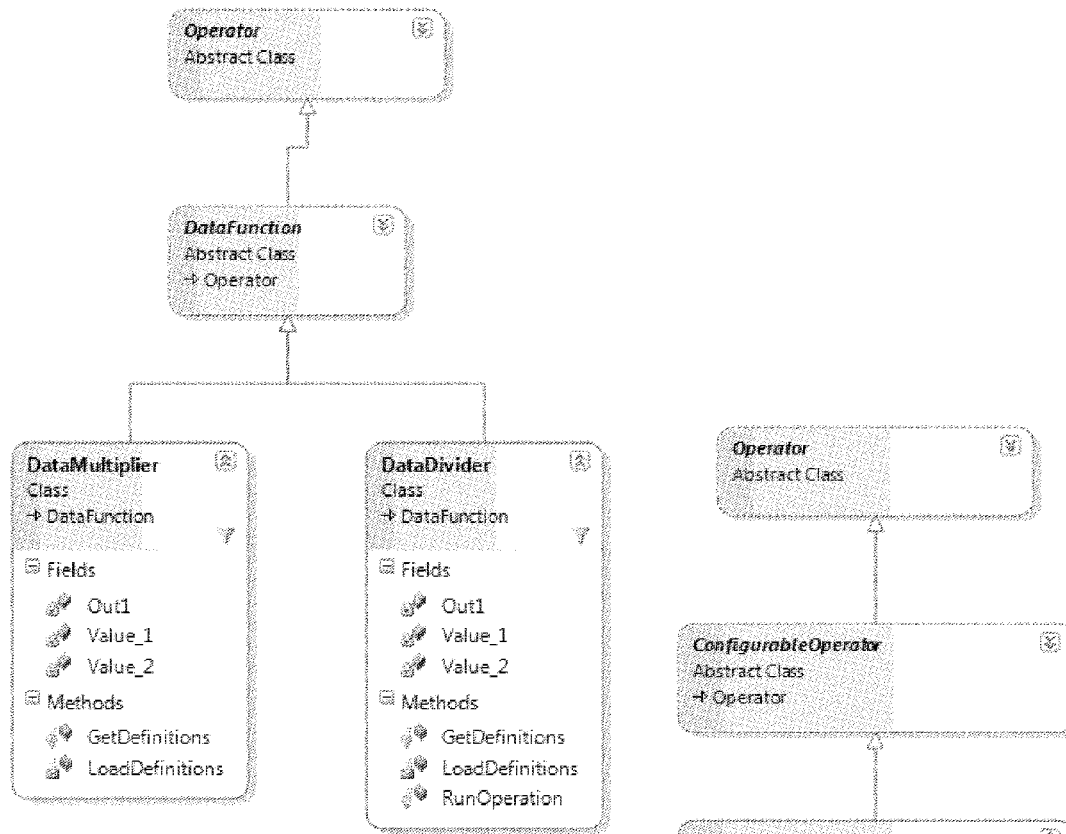
FIG. 10 shows the construction of a multiply and a divide operator in the exemplary rule-based structure.
FIG. 11 illustrates the construction of an execution plan from a series of operators in the exemplary rule-based structure.
Figure 12:
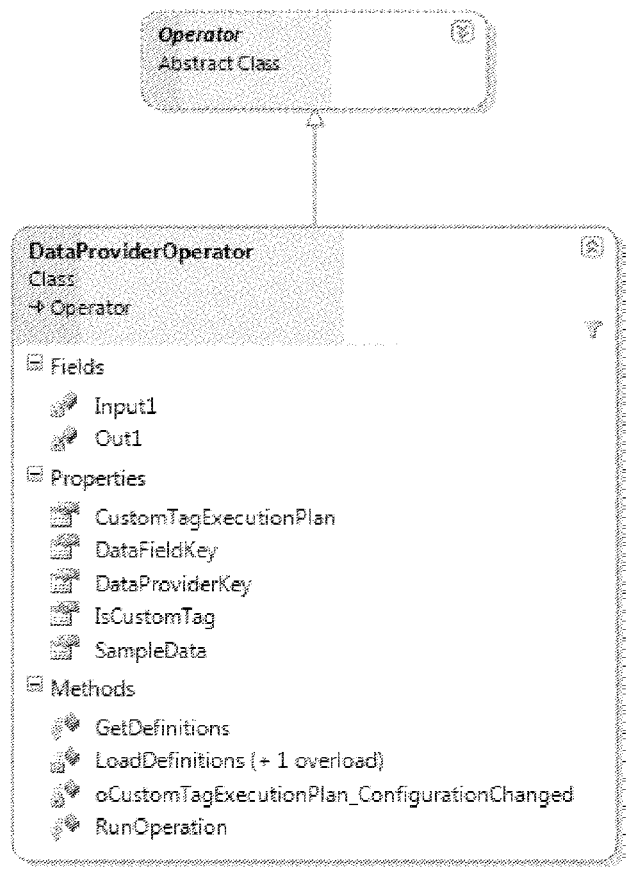
FIG. 12 shows the organization of an exemplary operator providing data originating from a data source.
Figure 13:
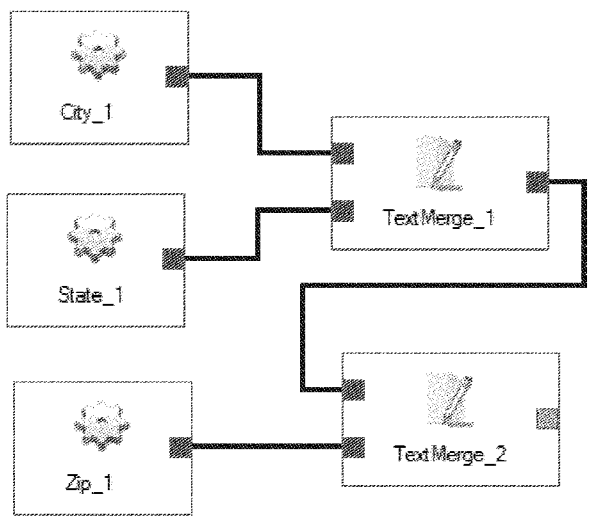
FIG. 13 illustrates the construction of an execution plan to merge address information from small-grained fields through a hierarchy of operators.

Now referring to FIG. 11, when a series of operators are connected together to perform a specific function the series can be scripted and saved as an execution plan. An execution plan is an object that inherits from the operator class. An execution plan encapsulates a collection of operators that are connected in series. The execution plan will expose the non-linked input and output parameters of the enclosed operators. Since the execution plan object inherits from the operator class it can also be used within other execution plans. The ability for execution plans to consume other execution plans allows the Formatter to build basic execution plans that can then be used in building more complex execution plans. Execution plan definitions, in the exemplary syntax, are scripted using XML or another scripting language. When an execution plan is defined the child operators are referenced by their class names so that the operators can be created using reflection. Since the operators can be added to the Formatter and the types of operators do not need to be static or "hard coded". FIG. 23 provides an exemplary execution plan in the exemplary format.

Formatter Screens

Figures 14, 15:
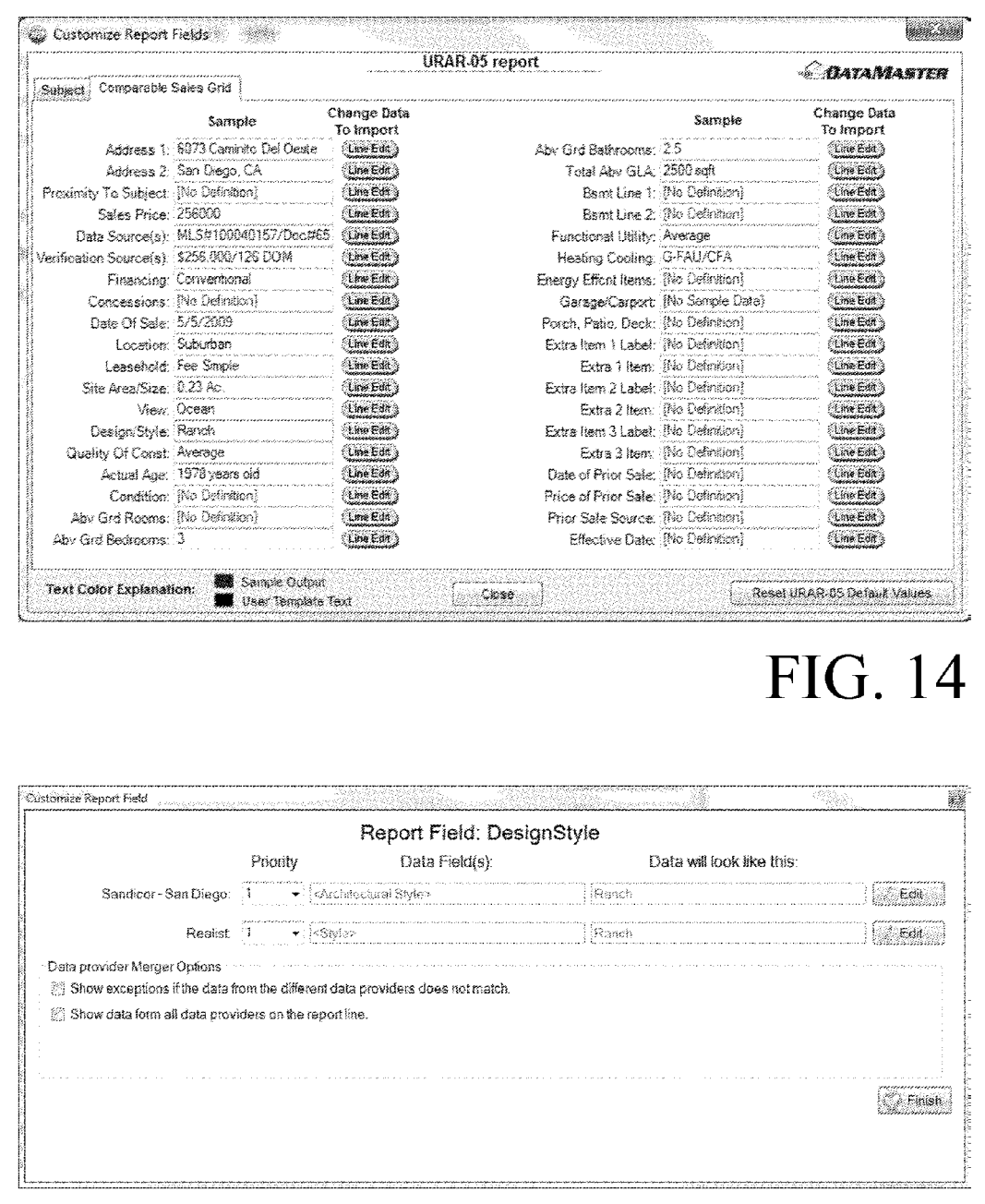

Screens within the exemplary Formatter are now shown and briefly explained. It is convenient that the Formatter, or other application that allows for the preparation of rules and map definitions, have a user interface such that it is not necessary to know the language used by the program, nor is it necessary to edit any files storing these rules or definitions. To that end, the exemplary Formatter has a windows-type interface through which the editing of these can be accomplished. Appearing in FIG. 14 is the main page for the "customize forms" section of the Formatter, showing the available report fields that data could be sent to, here in the "URAR-05" report. If the user wanted to define how the data should be sent they would click on the line edit button for that report line. Appearing at the bottom of the screen is a legend, declaring that sample data for a defined field appears in blue, fixed text in black, and undefined fields in red (as annotated by the [No Definition] text).

After clicking the Line Edit button the user will be presented with a window such as that shown in FIG. 15 which shows a line for each data provider that is supported for the user. The user can prioritize the data they want to use using the priority selection drop down boxes. To edit how data is read from a particular data provider the user can click the Edit button. When they are finished they can click the Finish button. Appearing in FIG. 16 is an XML sample of an execution plan that would be created using data from two data providers of FIG. 15, from the report of FIG. 14.

FIG. 17 shows the window detail when an edit button within FIG. 16 is clicked. This screen shows the user all of the available data elements for a particular data provider. Here, the program also allows the user to search through the data elements by keyword or class, in the event there are a large number to choose from. Once the desired data element is found the user can move it into the data section using the arrows. In the data element section the user can customize the specific element by clicking the Edit button of the data element, and upon doing so the user would be presented with a screen as that shown in FIG. 18, the resulting XML definition for that definition shown in FIG. 19.

Figure 20:
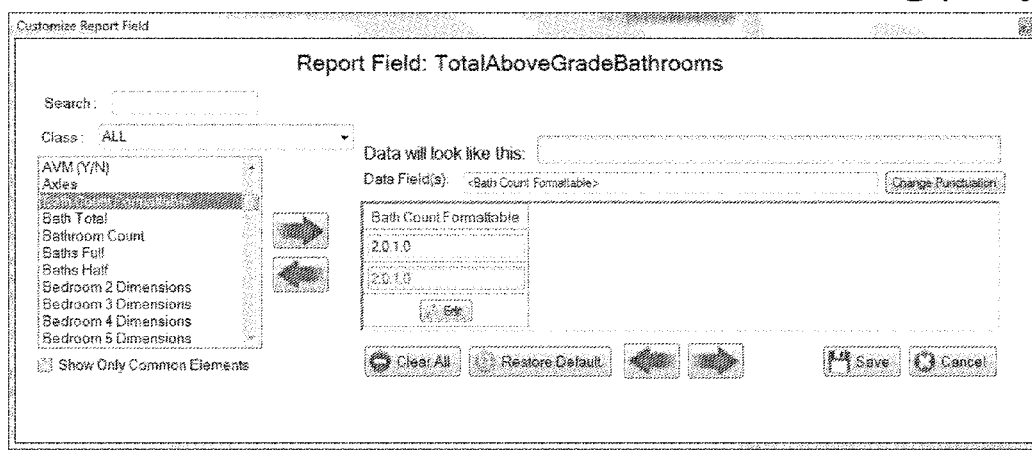
FIG. 20 shows another sample screen in the exemplary Formatter for customization of a field in a final report including a custom tag, which tag is usable as information as if it came from a data source.
Figure 22:
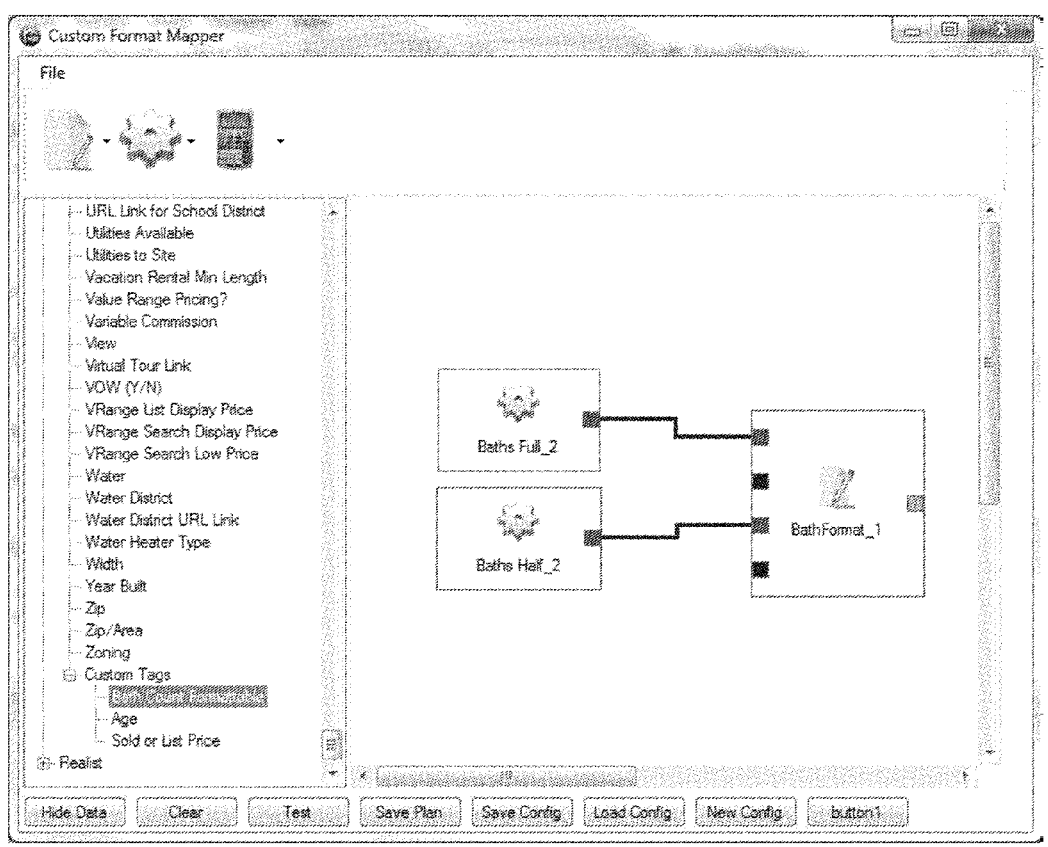
FIG. 22 shows an exemplary screen of a custom format mapper containing a graphical hierarchical representation of a custom tag.

Now referring to FIG. 20, users can also use "Custom Tags" that have been pre-built for specific functionality. When these are added they are saved as a nested execution plan within the execution plan as shown in the XML definition of FIG. 21. FIG. 22 shows another window showing the designer for the Custom Tag "BathCountFormattable" as defined in the text of FIG. 21.

Now although certain systems, products, components, functions and methods have been described above in detail, one of ordinary skill in the art will recognize that these functions and methods are adaptable to other systems and products that process data in real-estate environments and beyond. Likewise, although the described functions have been described through the use of block diagrams, flowcharts, software and hardware descriptions, one of ordinary skill in the art will recognize that most of the functions described herein may be implemented in software or hardware. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system for searching and conglomerating data from sources of real estate information utilizing different formats for real estate description data, the system comprising:
   a connection device for electronic communication over a network;
   a processing device;
   storage comprising at least one storage device;
   instructions stored in the storage which, when executed by the processing device, cause the system to:
   receive operator-based search criteria from an operator for producing a report, wherein the operator-based search criteria comprises a class and locality of properties;
   determine a plurality of sources of real estate information from which real estate property descriptions are to be obtained;
   for each of the plurality of sources of real estate information, determine source specific search criteria, wherein determining the source specific search criteria comprises translating the operator-based search criteria to match a format or capabilities for at least one of the plurality of sources of real estate information;
   provide the source specific search criteria to each of the plurality of sources of real estate information;
   receive from the plurality of sources of real estate information a result of searches performed using the source specific search criteria for the plurality of sources, wherein the result of the searches comprise a set of real estate information including descriptions of a number of real estate properties, each description including a number of characteristics of a property;
   translate the set of real estate information for each of the plurality of sources of real estate information into a common format in accordance with translational rules, wherein the translational rules are selected based on a consumer; and
   generate a report for the consumer based on the translated set of real estate information for the plurality of sources.

2. A system according to claim 1, wherein the instructions are further configured to:
   identify a consumer-based map definition, wherein the consumer-based map definition comprises the translational rules; and
   read the translational rules from the consumer-based map definition, wherein translating the set of real estate information for each of the plurality of sources of real estate information comprises translating based on the translational rules reads from the consumer-based map definition.

3. A system according to claim 2, wherein the instructions are further configured to obtain an operator-based map definition comprising the operator-based search criteria and to prioritize between rules contained in the consumer-based map definition and the operator-based map definition.

4. A system according to claim 3, wherein the instructions are further configured to apply a rule priority specified within one or more of the consumer-based map definition and the operator-based map definition.

5. A system according to claim 2, wherein the instructions are configured to determine the plurality of sources of real estate information based on a list from the consumer-based map definition.

6. A system according to claim 1, wherein the instructions are further configured to read a destination from an operator-based map definition and provide the report to the destination.

7. A system according to claim 1, wherein the instructions are further configured to receive an operator-based map definition over a network, the operator-based map definition comprises criteria for use against real estate information sources.

8. A system according to claim 1, wherein translating the set of real estate information comprises utilizing data tags from an operator-based map definition to identify and extract characteristics of properties.

9. A computer implemented method of conglomerating real estate descriptions from a plurality of real estate description databases, the method comprising:
   receiving operator-based search criteria from an operator for producing a report, wherein that operator-based search criteria represents a class and locality of properties;
   determining a plurality of sources of real estate information from which real estate property descriptions are to be obtained;
   for each of the plurality of sources of real estate information, determining source specific search criteria, wherein determining the source specific search criteria comprises translating the operator-based search criteria to match a format or capabilities for at least one of the pluralities of sources of real estate information;
   providing the source specific search criteria to each of the plurality of sources of real estate information;
   receiving from the plurality of sources of real estate information a result of searches performed using the source specific search criteria for the plurality of sources, wherein the result of the searches comprises a set of real estate information comprising descriptions of a number of real estate properties, wherein each description comprises a number of characteristics of a property;
   translating the set of real estate information for each of the plurality of sources of real estate information into a common format in accordance with translation rules, wherein the translation rules are selected based on a consumer; and
   generating a report for the consumer based on the translated set of real estate information for the plurality of sources.

10. A method according to claim 9, further comprising:
    identifying a consumer-based map definition, wherein the consumer-based map definition comprises the translational rules; and
    reading the translational rules from the consumer-based map definition, wherein translating the set of real estate information for each of the plurality of sources of real estate information comprises translating based on the translational rules read from the consumer-based map definition.

11. A method according to claim 10, further comprising applying rules from the consumer-based map definition and an operator-based map definition according to.

12. A method according to claim 11, wherein the priority is specified within one or more of the consumer-based map definition and the operator-based definition.

13. A method according to claim 10, wherein determining the plurality of sources of real estate information comprises determining based on a list from the consumer-based map definition.

14. A method according to claim 9, further comprising reading a destination from an operator-based map definition and providing the report to the destination.

15. A method according to claim 9, wherein the method further comprises receiving an operator-based map definition over a network, the operator-based map definition comprising criteria for use against real estate information sources.

16. A method according to claim 9, wherein translating the set of real estate information comprises utilizing data tags from an operator-based map definition to identify and extract characteristics of properties.

17. A method according to claim 9, further comprising delivering the report as a printout.

18. A method according to claim 9, further comprising delivering the report as a file stored to a storage device.

* * * * *